(12) United States Patent
Thivierge, Jr. et al.

(10) Patent No.: US 11,414,049 B2
(45) Date of Patent: Aug. 16, 2022

(54) KEY DELIVERY AND CONNECTIVITY MANAGEMENT FOR PHONE-BASED KEYS

(71) Applicant: FORD GLOBAL TECHNOLOGIES, LLC, Dearborn, MI (US)

(72) Inventors: Timothy Thivierge, Jr., Carleton, MI (US); Thomas Nelson, Plymouth, MI (US); Ali Hassani, Ann Arbor, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 17/014,876

(22) Filed: Sep. 8, 2020

(65) Prior Publication Data
US 2022/0073031 A1   Mar. 10, 2022

(51) Int. Cl.
| | |
|---|---|
| *B60R 25/24* | (2013.01) |
| *G06Q 30/02* | (2012.01) |
| *H04W 4/80* | (2018.01) |
| *G07C 9/00* | (2020.01) |
| *H04W 4/40* | (2018.01) |

(52) U.S. Cl.
CPC ............ *B60R 25/24* (2013.01); *G06Q 30/02* (2013.01); *G07C 9/00309* (2013.01); *H04W 4/40* (2018.02); *H04W 4/80* (2018.02); *B60R 2325/101* (2013.01); *B60R 2325/205* (2013.01); *G07C 2009/00865* (2013.01)

(58) Field of Classification Search
CPC ............ B60R 25/24; B60R 2325/1011; B60R 2325/205; H04W 4/80; H04W 4/40; G06Q 30/02; G07C 9/00309; G07C 2009/00865
See application file for complete search history.

(56) References Cited

U.S. PATENT DOCUMENTS

| | | | |
|---|---|---|---|
| 2016/0093216 A1* | 3/2016 | Lee | G06Q 50/30 340/870.11 |
| 2020/0298799 A1* | 9/2020 | Golsch | B60R 25/209 |
| 2021/0044861 A1* | 2/2021 | Fang | H04N 21/4131 |
| 2021/0327013 A1* | 10/2021 | Mendes | G07C 5/008 |
| 2021/0327188 A1* | 10/2021 | Schlacks, IV | G07C 9/27 |

FOREIGN PATENT DOCUMENTS

| | | |
|---|---|---|
| WO | 2018160863 A1 | 9/2018 |
| WO | 2018212717 A1 | 11/2018 |
| WO | 2019069129 A1 | 4/2019 |

* cited by examiner

*Primary Examiner* — Nabil H Syed
(74) *Attorney, Agent, or Firm* — Michael J. Spenner; Brooks Kushman P.C.

(57) ABSTRACT

A controller may implement a key delivery manager on the vehicle side to aid in control of consumer access key delivery. These controls may include, for example, key redelivery to a mobile device, choosing a type of key delivery according to availability of vehicle connectivity, and revoking keys according to availability of vehicle connectivity. By using the key delivery manager, the controller takes into account state knowledge as well as connectivity availability to dictate which delivery method (and subsequent user interactions) should be utilized.

17 Claims, 6 Drawing Sheets

KEY DELIVERY AND CONNECTIVITY MANAGEMENT FOR PHONE-BASED KEYS

TECHNICAL FIELD

Aspects of the present disclosure generally relate to phone-based key (PBK) systems, and, in particular, to key delivery and connectivity management for phone-based keys.

BACKGROUND

Vehicle key fobs may be used to allow a user to gain access to a vehicle. Some fob devices operate such that when a key is pressed on the fob, the device sends a code to the vehicle to instruct the vehicle to unlock the vehicle. Passive-entry key fobs operate to provide response to a challenge pulse train sent by the vehicle, where, if a proper response is received by the vehicle, then the door may be unlocked by a user grasping the door handle. PBK systems allow users to utilize their phones to unlock a vehicle without requiring a key fob device. These systems may operate similar to a key fob, but where the phone communicates with the vehicle over BLUETOOTH Low Energy (BLE) or other wireless technologies.

SUMMARY

A controller may implement a key delivery manager on the vehicle side to aid in control of consumer access key delivery. These controls may include, for example, key redelivery to a mobile device, choosing a type of key delivery according to availability of vehicle connectivity, and revoking keys according to availability of vehicle connectivity. By using the key delivery manager, the controller takes into account state knowledge as well as connectivity availability to dictate which delivery method (and subsequent user interactions) should be utilized.

In one or more illustrative examples, a system for connectivity management for phone-based keys is described. The system includes a vehicle including one or more controllers. The one or more controllers are configured to request a consumer access key from a phone-as-a-key server using a cellular connection of the one or more controllers when the cellular connection is available. The one or more controllers are further configured to request the consumer access key over a local connection of the one or more controllers to a mobile device when the cellular connection is unavailable and the local connection is available. The one or more controllers are further configured to receive the consumer access key to the one or more controllers via the cellular or local connection over which the consumer access key was requested.

In one or more illustrative examples, a method for connectivity management for phone-based keys by a vehicle is described. The method includes requesting a consumer access key from a phone-as-a-key server using a cellular connection of one or more controllers of a vehicle when the cellular connection is available. The method further includes requesting the consumer access key over a local connection of the one or more controllers to a mobile device when the cellular connection is unavailable and the local connection is available. The method further includes receiving the consumer access key to the one or more controllers via the cellular or local connection over which the consumer access key was requested.

In one or more illustrative examples, a non-transitory computer-readable medium includes instructions for connectivity management for phone-based keys, that, when executed by a processor of a vehicle, cause the vehicle to perform operations. These operations include to request a consumer access key from a phone-as-a-key server using a cellular connection of one or more controllers of the vehicle when the cellular connection is available, to request the consumer access key over a local connection of the one or more controllers to a mobile device when the cellular connection is unavailable and the local connection is available; and to receive the consumer access key to the one or more controllers via the cellular or local connection over which the consumer access key was requested.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Figure 1:
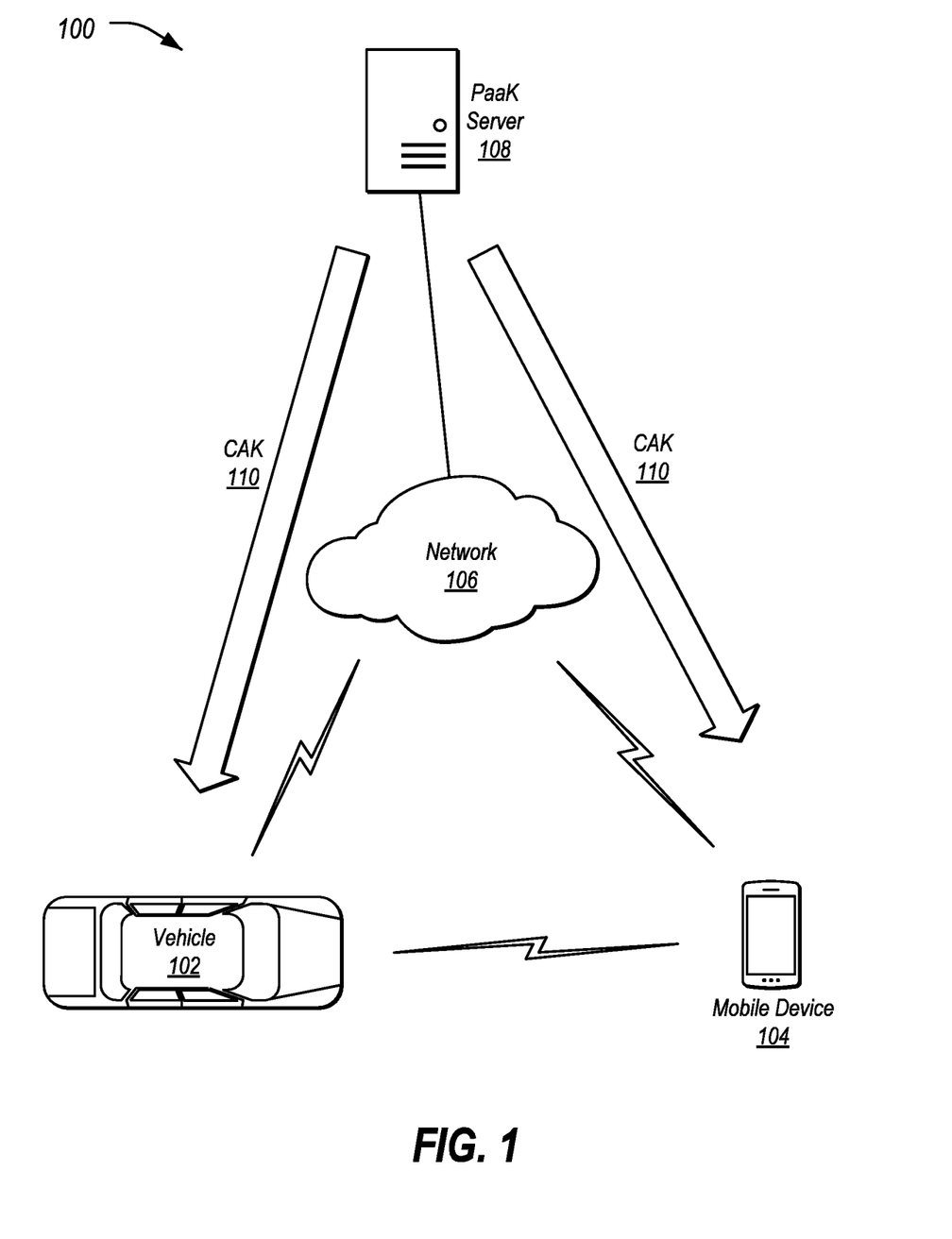
FIG. 1 illustrates an example system for distribution of a consumer access key.

FIG. 1 illustrates an example system for distribution of a Consumer Access Key (CAK) 110. PBK systems and methods perform user authentication through the usage of the CAK 110. In such a system, a Phone-as-a-Key (PaaK) server 108 may issue a CAK 110 to both a vehicle 102 and to a mobile device 104 for use in authentication. To perform the authentication, the vehicle 102 may confirm that the CAK 110 offered by the mobile device 104 matches or otherwise corresponds to a CAK 110 maintained by the vehicle 102. If so, access to the vehicle 102 may be granted to the user of the mobile device 104. If not, access may be denied.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a plurality of controllers configured to perform and manage various vehicle 102 functions under the power of the vehicle battery and/or drivetrain. As some non-limiting vehicle controller examples: a powertrain controller may be configured to provide control of engine operating components (e.g., idle control components, fuel delivery components, emissions control components, etc.) and for monitoring status of such engine operating components (e.g., status of engine codes); a body controller may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller may be configured to provide commands to control the powertrain, steering, or other aspects of the vehicle 102; a climate control management controller may be configured to provide control of heating and cooling system components (e.g., compressor clutch, blower fan, temperature sensors, etc.); a global positioning system (GPS) controller may be configured to provide vehicle location information; and a human-machine interface (HMI) controller may be configured to receive user input via various buttons or other controls, as well as provide vehicle status information to a driver, such as fuel level information, engine operating temperature information, and current location of the vehicle 102.

The vehicle bus may include various methods of communication available between the vehicle controllers, as well as between the telematics control unit (TCU) and the vehicle controllers. As some non-limiting examples, a vehicle bus may include one or more of a vehicle controller area network (CAN), an Ethernet network, and a media-oriented system transfer (MOST) network. Further aspects of the layout and number of vehicle buses are discussed in further detail below. The TCU may include network hardware configured to facilitate communication between the vehicle controllers and with other devices of the access control system 100. For example, the TCU may include or otherwise access a cellular modem configured to facilitate communication with other vehicles 102 or with infrastructure. The TCU may, accordingly, be configured to communicate over various protocols, such as with a communication network over a network protocol (such as Uu). The TCU may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained.

The mobile device 104 may further include various wireless transceivers, such as a BLUETOOTH, BLE, ultra-wide band (UWB), and/or Wi-Fi transceiver, as well as a transceiver for communication over the communications network 106. The communications network 106 may include one or more interconnected communication networks such as the Internet, a cable television distribution network, a satellite link network, a local area network, and a telephone network, as some non-limiting examples. The vehicle 102 may also include a TCU. The TCU may include network hardware configured to facilitate communication between the vehicle 102 and other devices of the access control system 100. For example, the TCU may include or otherwise access a cellular modem configured to facilitate communication with the communications network 106. The PaaK server 108 may be an example of a networked computing device that is accessible to the vehicle 102 and/or the mobile device 104 over the communications network 106.

The CAK 110 may be an encryption key configured for the vehicle 102 and the mobile device 104 to identify and authenticate each other for access to the vehicle. As shown, the CAK 110 is provided over the communications network 106 from the PaaK server 108 to a vehicle 102 and to a mobile device 104.

The CAK 110 may include metadata specifying permissions that authorize the user to perform selective activities with the vehicle 102. These permissions may define limitations with respect to location, duration, date/time, and/or vehicle 102 functionality (e.g., limited driving modes). These permissions may also involve granting or withholding access to other vehicle 102 features, such as remote vehicle 102 control (e.g., remote parking, remote trailering, automated valet and automated summon, etc.), as well as whether 2-factor authentication of the user is required. As one example, the CAK 110 may specify permissions that automatically deactivate at a predefined time. As another example, the CAK 110 may exclude use of performance features. As yet another example, the CAK 110 may allow access to the vehicle 102 (e.g., to the trunk, to the vehicle 102 cabin, etc.), but not permission to start the vehicle 102. As an even further example, erratic driving behavior may trigger the CAK 110 to automatically de-authorize the user.

In some examples, the PaaK server 108 may automatically revoke the CAK 110 responsive to certain conditions being met. For instance, and similar to the metadata permissions that may be associated with the CAK 110, the conditions may include limitations with respect to location, duration, date/time, and/or driving behavior. To enforce the conditions, the vehicle 102 may be configured to send vehicle 102 information from the controllers to the PaaK server 108. This information may include, as some examples, speed, acceleration, current location, yaw, fuel usage, fuel level, and/or temperature information. The information may further include an identifier of the vehicle 102, such as a VIN or other account, a network controller identifier of the mobile device 104 accessing the vehicle 102, and/or an identifier of the CAK 110 being used to provide access to the vehicle 102. Using the vehicle 102 information, the PaaK server 108 may determine whether the conditions have been met for remote revocation of the CAK 110. If so, the PaaK server 108 may perform a revoke of the CAK 110. Or, in another example, the PaaK server 108 may send a request for approval with respect to extending the permissions of the CAK 110. For instance, in a ride share use case (such as car sharing or rental vehicles), the user may be contacted using an app on his/her mobile device 104 to ask if he/she would like to request a condition extension. This extension may, in some examples, also require approval by the owner or operator of the vehicle 102, additional payment by the user, etc.

Figure 2:
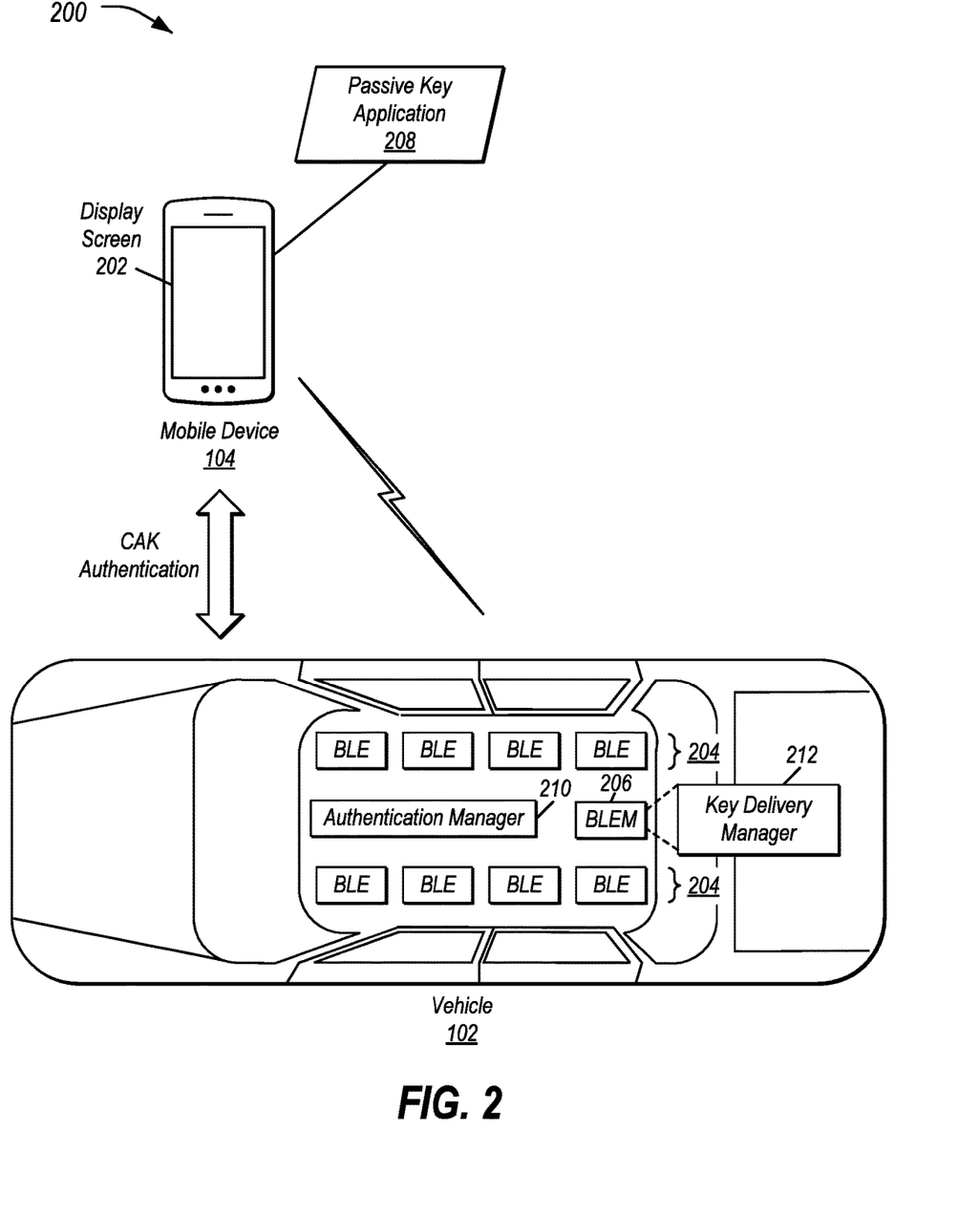
FIG. 2 illustrates an example portion of the access control system including further details of the vehicle and the mobile device.

FIG. 2 illustrates an example portion of the access control system 100 including further details of the vehicle 102 and the mobile device 104. As shown, the vehicle 102 may include an array of BLE transceivers 204 configured to facilitate communication between the mobile device 104 and the vehicle 102. For instance, each BLE transceiver 204 may be connected to one or more antennas to form an array that may be used to triangulate or otherwise detect the location of the mobile device 104. The BLE transceivers 204 may be controlled by a BLE module (BLEM) 206 including a memory and a processor programmed to send and receive messaging between the mobile device 104 and the vehicle 102, e.g., to provide for the performance of challenge-response sequences and/or to receive commands from the vehicle 102. In an example, a key fob may connect to the closest-detected BLE transceiver 204 to communicate with the BLEM 206 of the vehicle 102. As shown the vehicle 102 includes eight BLE transceivers 204, but it should be noted that implementations may include more or fewer transceivers and/or antennas.

The mobile device 104 may also include a display 202 configured to provide a user interface to a user. In some examples, the display 202 may be touch-sensitive, and may be further configured to receive input from the user. Additionally, a passive key application 208 may include instructions that, when executed by the one or more processors of the mobile device 104, cause the mobile device 104 to perform operations to facilitate access to the vehicle 102. In an example, the passive key application 208 may cause the mobile device 104 to display a user interface to the display 202 including controls similar to those of a key fob, e.g., lock, unlock, start, etc. In another example, the passive key application 208 may cause the mobile device 104 to interact as a passive entry device with the vehicle 102, providing presence information to the BLEM 206 that allows the vehicle 102 to detect that an authorized user of the vehicle 102 is nearby. By executing the passive key application 208 to control communication of the mobile device 104 with the BLEM 206 of the vehicle 102, the mobile device 104 may be used to unlock, start, or otherwise access the vehicle 102.

The passive key application 208 may allow for the authentication of the mobile device 104 to the vehicle 102 using an authentication manager 210 of the vehicle 102. The authentication manager 210 may be a controller of the vehicle 102 that is in communication with the BLEM 206, as well as with other components of the vehicle 102, such as door locks or vehicle ignition interlock. The authentication of the mobile device 104 to vehicles 102 may utilize a PaaK feature implementation, ensuring a secure connection between the user mobile device 104 and a vehicle connectivity module (such as the BLEM 206), whereby the user position can be localized utilizing the BLE transceiver 204 antennas. Moreover, the BLE link layer encryption adds communication security.

The combination of CAK 110 and BLE a pairing personal identification number (PIN) may be delivered to the mobile device 104 and the vehicle 102 at the onset of account creation. This may be referred to as key delivery. One use case for key delivery includes the situation in which both the mobile device 104 and the vehicle 102 are set up for long-term use during vehicle 102 ownership.

Depending on the scenario, key delivery may need to be implemented differently. For example, initial key delivery may behave differently than key re-delivery in situations where the user has accidently removed the passive key application 208 (e.g., either unintentional app deletion or an operating system update to the mobile device 104 corrupts or otherwise requires reinstallation of the passive key application 208). Furthermore, vehicle 120 connectivity may not necessarily be guaranteed. Thus, the channel over which the CAK 110 may be delivered to the vehicle 102 may vary as well (e.g., delivery from the PaaK server 108 to the vehicle 102 directly, delivery from the PaaK server 108 to the mobile device 104, where the mobile device 104 transfers the CAK 110 to the vehicle 102.

As such, it may be desirable to create a key delivery management strategy that takes into account the PaaK state (e.g., whether or not the mobile device 104 has been BLE paired to the vehicle 102), as well as connectivity state (e.g., whether the vehicle 102 has access to the communications network 106 to communicate with the PaaK server 108). By accounting for these aspects, the key delivery management strategy may avoid causing the user to perform extra steps (e.g., redoing BLE pairing unnecessarily if re-delivering a key), as well as allowing for key delivery in situations where otherwise the vehicle 102 may be unable to interact with the PaaK server 108 at all.

As discussed in detail here, the BLEM 206 may implement a key delivery manager 212 on the vehicle 102 side to aid in control of the CAK 110 delivery. These controls may include, for example, an example process for key redelivery to a mobile device (discussed with respect to FIG. 3), an example process for choosing a type of key delivery according to availability of vehicle connectivity (discussed with respect to FIG. 4), and an example process for revoking keys according to availability of vehicle connectivity (discussed with respect to FIG. 5). By using the key delivery manager 212, the BLEM 206 may takes into account state knowledge as well as connectivity availability to dictate which delivery method (and subsequent user interactions) should be utilized.

Figure 3:
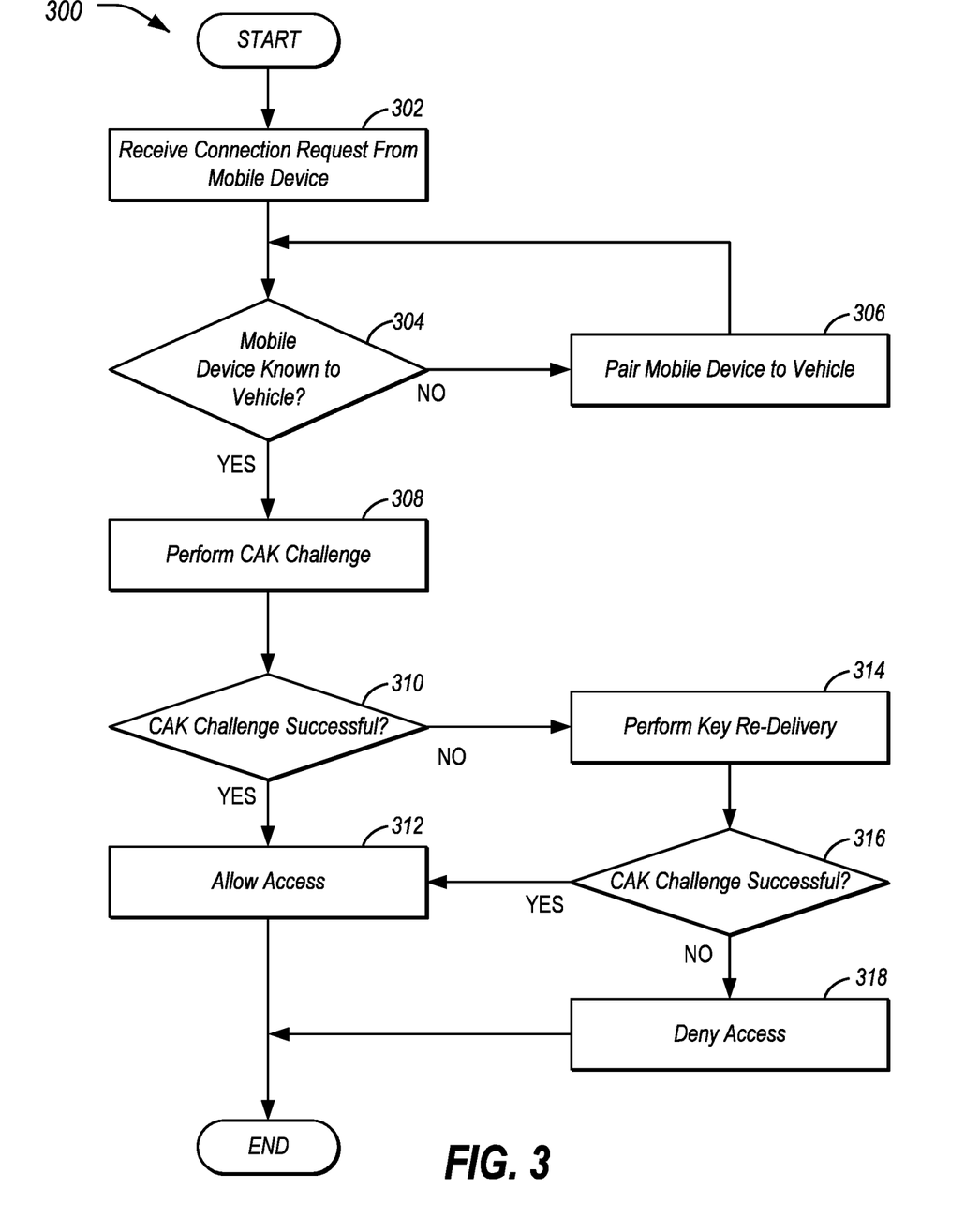
FIG. 3 illustrates an example process for key redelivery to a mobile device.

FIG. 3 illustrates an example process 300 for key redelivery to a mobile device 104. In an example the process 300 may be performed by the key delivery manager 212 of the BLEM 206 of the vehicle 102, in the context of the access control system 100.

At operation 302, the vehicle 102 receives a connection request from a mobile device 104. For instance, a user of the mobile device 104 may passively attempt access to the vehicle 102.

At operation 304, the vehicle 102 determines whether the mobile device 104 is known to the vehicle 102. In an example, the vehicle 102 determines whether a network controller identifier of the mobile device 104, such as media access control (MAC) address, is known to the vehicle 102 as being that of an allowed device. If the mobile device 104 is not known, control passes to operation 306 to pair the mobile device 104 with the vehicle 102. This pairing process may include, for example, a BPEK security challenge between the mobile device 104 and the vehicle 102 involving a shared key. After operation 306, control returns to operation 304.

If, however, at operation 304 the mobile device 104 is known to the vehicle 102, control passes from operation 304 to operation 308. At operation 308, the vehicle 102 performs a CAK 110 challenge with the mobile device 104. To perform the authentication, the vehicle 102 may confirm that the CAK 110 offered by the mobile device 104 matches or otherwise corresponds to a CAK 110 maintained by the vehicle 102. At operation 310, the vehicle 102 determines whether the CAK 110 challenge was successful. If so, control passes to operation 312 to grant access to the vehicle 102 to the user of the mobile device 104. If not, control passes to operation 314.

At operation 314, the vehicle 102 performs key re-delivery. For instance, the vehicle 102 may request to the PaaK server 108 that a new CAK 110 be sent to the mobile device 104 and to the vehicle 102. This new CAK 110 may address situations where, for example, the mobile device 104 is paired to the vehicle 102, but the CAK 110 on the mobile device 104 is corrupted, out-of-date, or deleted.

Next, at operation 316, the vehicle 102 determines whether a second CAK 110 challenge is successful. This second CAK 110 challenger may be performed similar to the challenge at operation 308. If so, control passes to operation 312 to grant access to the vehicle 102. If not control passes to operation 318 to deny access to the vehicle 102.

Thus, initial CAK 110 delivery to the mobile device 104 may follow a complete process of transmitting the CAK 110 and requesting the user to input a BLE pairing PIN to establish a bonded session. Secondary key delivery may reduce the number of steps the user has to perform by incorporating prior knowledge shared by the mobile device 104 and BLEM 206 (e.g., no PIN entry). For example, if the passive key application 208 was accidently removed from the mobile device 104, the CAK 110 would be deleted from the mobile device 104 but both parties would still share the bonding information. Given the bonding information is known, a secure session could be directly established after CAK 110 delivery without the user needing to re-input the BLE pairing PIN. Furthermore, if the mobile device 104 connected to a paired session directly, the BPEK may be skipped, although the CAK 110 challenge may still be necessary.

It should be noted that to consolidate space on the BLEM 206, secondary key delivery may result in the removal of the previous CAK 110 and/or other metadata associated with that set of bonding information. This may also result in a revocation message being sent to the PaaK server 108 as well to ensure the PaaK server 108 can properly synchronize CAKs 110 in use. All instances of the previous CAK 110 would then be revoked by the PaaK server 108 in response. For instance, the PaaK server 108 may send revocation messages to any vehicles 102 and/or mobile devices 104 registered with the PaaK server 108 as having the previous CAK 110. Responsive to receipt of the revocation messages, the vehicles 102 and/or mobile devices 104 would then remove the previous CAK 110. In some instances, this revocation may also result in a message being sent to the mobile device 104, informing the user to unpair the vehicle 102 manually.

Figure 4:
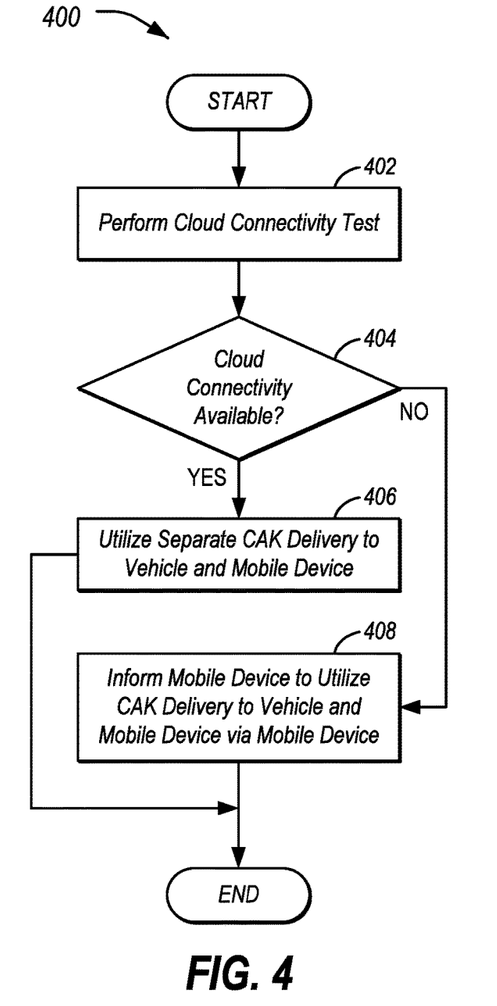
FIG. 4 illustrates an example process for choosing a type of key delivery according to availability of vehicle connectivity.

FIG. 4 illustrates an example process 400 for choosing a type of key delivery according to availability of vehicle 102 connectivity. In an example, as with the process 300, the process 400 may be performed by the key delivery manager 212 of the BLEM 206 of the vehicle 102, in the context of the access control system 100. It should be noted that CAK 110 delivery may be desired based on various conditions, such as expiration of an existing CAK 110, pairing of a new mobile device 104 to the vehicle 102, responsive to a request from the PaaK server 108 to refresh one or more or all CAKs 110, etc.

At operation 402, the vehicle 102 performs a cloud connectivity test. In an example, responsive to the BLEM 206 determining to engage CAK 110 key delivery, the BLEM 206 performs a cloud connectivity test. This test may, for example, involve identifying whether the BLEM 206 is capable of communicating with the PaaK server 108 over the communications network 106 via the vehicle 102 TCU. At operation 404, the vehicle 102 determines whether cloud connectivity is available. If the connectivity test is successful, control passes to operation 406. Otherwise, if no response is received from the PaaK server 108 or if connectivity otherwise cannot be established via the communications network 106, control passes to operation 408.

At operation 406, the vehicle 102 utilizes separate CAK 110 delivery to the vehicle 102 and to the mobile device 104. In an example, the BLEM 206 may informs the PaaK server 108 to perform a first key delivery method in which the PaaK key delivery data is sent from the PaaK server 108 to both the mobile device 104 and the vehicle 102 separately and directly. Such an approach may be useful for situations involved always connected vehicles 102, such as autonomous vehicles 102.

At operation 408, the vehicle 102 informs the mobile device 104 to perform CAK 110 delivery to the vehicle 102 and to the mobile device 104. In the scenario, the BLEM 206 may inform the mobile device 104 to perform a second key delivery method, in which the mobile device 104 receives both key delivery packets (e.g., the CAK 110 packet for the mobile device 104 and also the CAK 110 packet for the vehicle 102) and transmits the packet for the vehicle 102 to the BLEM 206 via BLE. Such an approach may be useful for situations involved vehicles 102 lacking connectivity, in locations where connectivity is unreliable or unavailable, or having subscriptions to the communications network 106 that have lapsed, such as consumer vehicles 102 where connectivity is no longer purchased. It should be noted that the first key delivery method may have improved security as compared to the second key delivery method, as in the first key delivery method the mobile device 104 does not have access to the information sent to the vehicle 102 (even if the vehicle 102 information is sent in encrypted form).

Thus, both the CAK 110 for the mobile device 104 and the CAK 110 for the vehicle 102 may be delivered through the mobile device 104, where the mobile device 104 then transmits the CAK 110 for the vehicle 102 to the BLEM 206. However, the vehicle 102 revoke process for the CAK 110 also may require connectivity. Therefore, if the vehicle 102 does not have or no longer has a data plan, CAKs 110 cannot be revoked from the BLEM 206. As more and more CAKs 110 are delivered and need to be revoked for any reason (e.g., user gets new mobile device 104, user sells a vehicle 102 and the new owner needs to add new CAKs 110, etc.), the CAK 110 slots on the BLEM 206 become used up (the BLEM 206 may only store a fixed number of CAKs 110, such as twenty-five or forty). If all CAK 110 slots are full, the user may be unable to add any new mobile devices 104 without having an active cellular plan for the vehicle 102.

Figure 5:
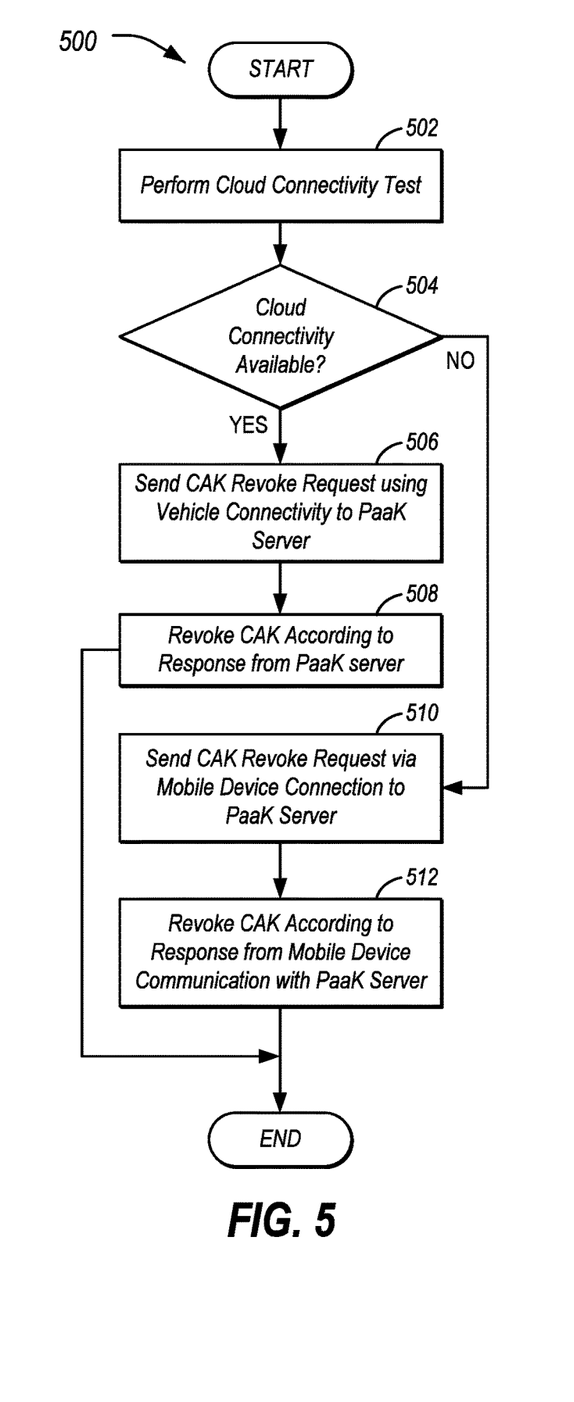
FIG. 5 illustrates an example process for revoking keys according to availability of vehicle connectivity.

FIG. 5 illustrates an example process 500 for revoking keys according to availability of vehicle 102 connectivity. In an example, as with the processes 300 and 400, the process 500 may be performed by the key delivery manager 212 of the BLEM 206 of the vehicle 102, in the context of the access control system 100. This process may be useful, for example, to revoke CAKs 110 regardless of availability of cellular connectivity to the vehicle 102.

At operation 502, the vehicle 102 performs a cloud connectivity test. In an example, similar to as discussed above with respect to operation 402 of the process 400, this test may, for example, involve identifying whether the BLEM 206 is capable of communicating with the PaaK server 108 over the communications network 106 via the vehicle 102 TCU. At operation 504, the vehicle 102 determines whether cloud connectivity is available. If the test at operation 502 is successful, control passes to operation 506. Otherwise, if no response is received from the PaaK server 108 or if connectivity otherwise cannot be established via the communications network 106, control passes to operation 510.

At operation 506, the vehicle 102 sends the CAK 110 revoke request using vehicle 102 connectivity to the PaaK server 108. In an example, the BLEM 206 may direct the TCU of the vehicle 102 to send the CAK 110 revoke request over the communications network 106 to the PaaK server 108. The PaaK server 108 may accordingly send a response to the vehicle 102 to revoke the CAK 110. At operation 508, the vehicle 102 revokes the CAK 110 according to the response from the PaaK server 108. Accordingly the slot of the BLEM 206 that the CAK 110 was residing in is now available for a new CAK 110. After operation 508, the process 500 ends.

At operation 510, the vehicle 102 sends the CAK 110 revoke request using via mobile device 104 connectivity to the PaaK server 108. In an example, the BLEM 206 may direct a mobile device 104 connected to the vehicle 102 to send the CAK 110 revoke request over the communications network 106 to the PaaK server 108. This may be done responsive to the vehicle 102 identifying connection to the vehicle of a mobile device 104 (e.g., that has been paired to the BLEM 206, or in other cases any device with connectivity regardless of whether it has been authenticated to the vehicle 102). This revoke request may be encrypted to ensure security of the request. The PaaK server 108 may accordingly send a response to the mobile device 104 to revoke the CAK 110. At operation 512, the vehicle 102 revokes the CAK 110 according to the response from the PaaK server 108, as forwarded to the vehicle 102 from the connected mobile device 104. Accordingly, the slot of the BLEM 206 that the CAK 110 was residing in is now available for a new CAK 110, despite the lack of cellular connectivity between the TCU of the vehicle 102 and the PaaK server 108. After operation 512, the process 500 ends.

Figure 6:
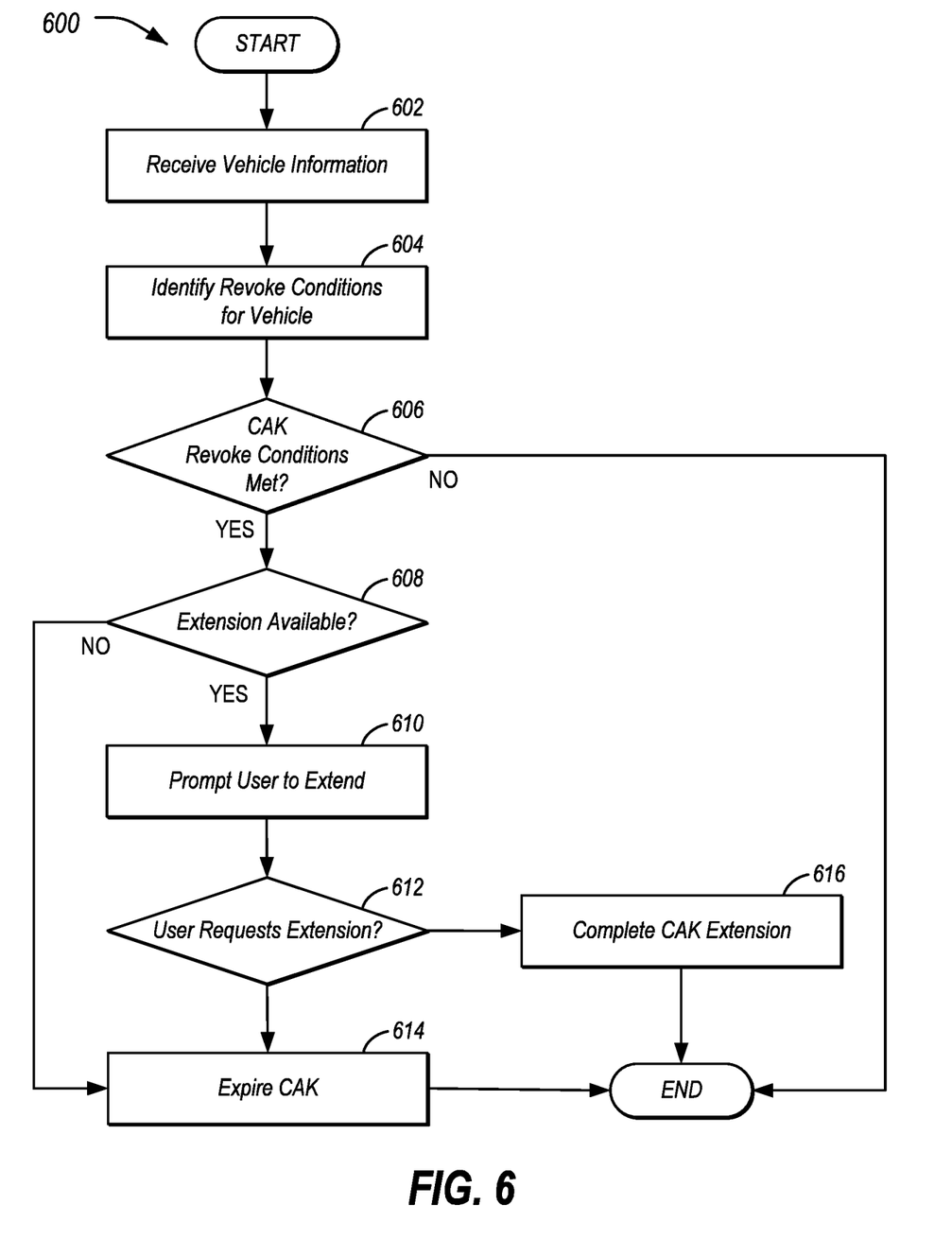
FIG. 6 illustrates an example process for server-side revocation of keys.

FIG. 6 illustrates an example process 600 for server-side revocation of keys. For instance, the process 600 may be performed by the PaaK server 108 in the context of the access control system 100. In an example, the process 600 may be performed periodically, responsive to receipt of the information at operation 602, etc., or at some other timing capable of selectively revoking the CAK 110 based on conditions.

At operation 602, the PaaK server 108 receives vehicle 102 information. In an example, the vehicle 102 may be configured to send, and the PaaK server 108 may be configured to receive, information from the controllers of the vehicle 102. This information may include, as some examples, speed, acceleration, current location, yaw, fuel usage, fuel level, and/or temperature information. The information may further include an identifier of the vehicle 102, such as a VIN or other account, a network controller identifier of the mobile device 104 accessing the vehicle 102, and/or an identifier of the CAK 110 being used to provide access to the vehicle 102.

At operation 604, the PaaK server 108 identifies CAK 110 revoke conditions for the vehicle 102. In an example, the PaaK server 108 may access a storage of the PaaK server 108 according to the received identifier of the CAK 110 and/or the vehicle 102 to retrieve the CAK 110 revoke conditions.

At operation 606, the PaaK server 108 determines whether the CAK 110 revoke conditions have been met. For instance, the PaaK server 108 may determine, based on current location information received from the vehicle 102, whether the vehicle 102 is within location restrictions permitted by the CAK 110. As another example, the PaaK server 108 may determine, based on distance traveled information received from the vehicle 102, whether the vehicle 102 is within maximum driving distance restrictions permitted by the CAK 110. As yet another example, the PaaK server 108 may determine, based on speed or acceleration information received from the vehicle 102, whether the vehicle 102 is being operated in an appropriate driving style consistent with use via the CAK 110. If the CAK 110 revoke conditions have not been met, the process 600 ends. If, however, the conditions have been met, control passes to operation 608.

At operation 608, the PaaK server 108 determines whether extensions are available. For instance, there may be cases in which the user of the CAK 110 may be allowed to extend aspects of the revoke conditions for the CAK 110. As one possibility, a rented vehicle 102 may have the option for extension of time and/or distance for continued use of the vehicle 102.

At operation 610, the PaaK server 108 prompts the user whether the user wants to extend the conditions for the CAK 110. For instance, the PaaK server 108 may send the prompt to the user's mobile device 104. The prompt may indicate to the user that the CAK 110 will expire and may offer the additional time or mileage. In some examples, the prompt indicate a charge, if any, for the extension.

At operation 612, the PaaK server 108 determines whether the user requested an extension. In an example, the user of the mobile device 104 may accept or reject the prompt, and that result may be sent from the mobile device 104 and received to the PaaK server 108. If the response is negative (or times out), control passes to operation 614 in which the PaaK server 108 expires the CAK 110. Or, if the response is positive, at operation 616 the PaaK server 108 completes the extension of the conditions of the CAK 110. This may involve updating the revoke conditions in storage, as well as incurring a charge to the user. This may also involve receiving confirmation that an extension is allowable from the owner/operator of the vehicle 102. After operations 614 or 616, the process 600 ends.

Figure 7:
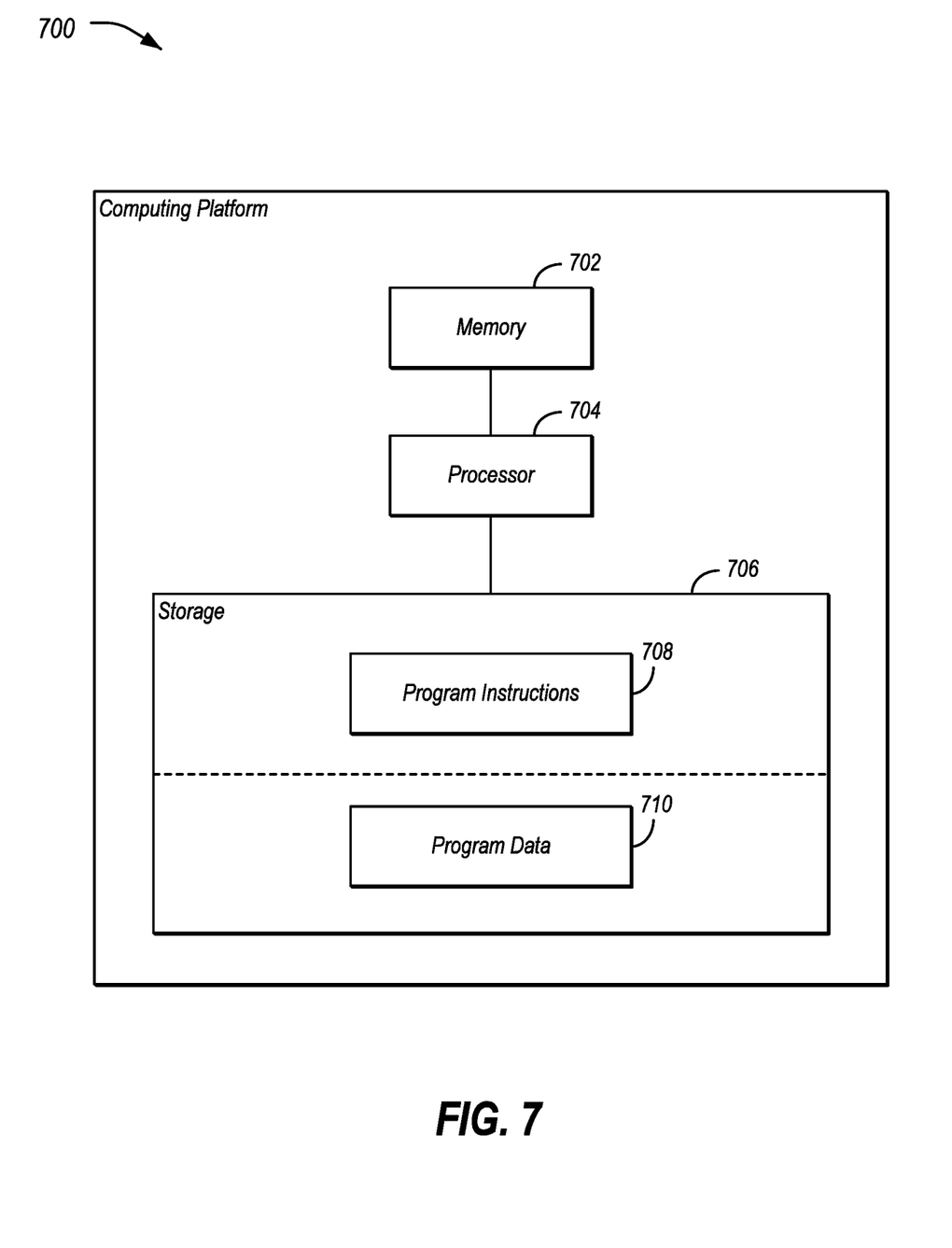
FIG. 7 illustrates an example computing device for the use with key delivery and connectivity management for phone-based keys.

FIG. 7 illustrates an example computing device 700 for the use with key delivery and connectivity management for phone-based keys. Devices discussed herein, such as the vehicle 102, TCU, the BLEM 206, the mobile device 104, and the PaaK server 108 may include devices such as the computing device 700. Likewise, the operations performed herein, such as those of the processes 300, 400, 500, and 600, may be implemented with such a computing device 700. The computing device 700 may include memory 702, processor 704, and non-volatile storage 706. The processor 704 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 702. The memory 702 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 706 may include one or more persistent data storage devices such as a hard drive, optical drive, tape drive, non-volatile solid-state device, cloud storage or any other device capable of persistently storing information.

The processor 704 may be configured to read into memory 702 and execute computer-executable instructions residing in program instructions 708 of the non-volatile storage 706 and embodying algorithms and/or methodologies of one or more embodiments. The program instructions 708 may include operating systems and applications. The program instructions 708 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 704, the computer-executable instructions of the program instructions 708 may cause the computing device 700 to implement one or more of the algorithms and/or methodologies disclosed herein. The non-volatile storage 706 may also include data 710 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for connectivity management for phone-based keys, comprising:
a vehicle including one or more controllers configured to:
request a consumer access key from a phone-as-a-key server using a cellular connection of the one or more controllers when the cellular connection is available;
request the consumer access key over a local connection of the one or more controllers to a mobile device when the cellular connection is unavailable and the local connection is available;
receive the consumer access key to the one or more controllers via the cellular or local connection over which the consumer access key was requested;
responsive to connection of the mobile device to the vehicle, confirm that the mobile device has a network controller identifier previously paired to the vehicle, the pairing including entry of a personal identification code;
responsive to the confirm, perform a consumer access key challenge with the mobile device, the challenge including verifying the consumer access key of the mobile device with the consumer access key of the vehicle;
response to failure of the consumer access key challenge with the mobile device, request, from the vehicle to the phone-as-a-key server, re-delivery to the mobile device of the consumer access key of the mobile device, the re-delivery avoiding re-entry of the personal identification code;
responsive to the re-delivery of the consumer access key of the mobile device, perform a second consumer access key challenge with the mobile device; and
allow or deny access to the vehicle based on the second consumer access key challenge.

2. The system of claim 1, wherein the one or more controllers are further configured to:
responsive to a request for the consumer access key to be retrieved from the phone-as-a-key server and cellular connectivity to a communications network being available to the vehicle via a telematics controller of the vehicle, request the consumer access key via cellular connectivity using the telematics controller and receive the consumer access key via cellular connectivity using the telematics controller; and
responsive to the request for the consumer access key to be retrieved from the phone-as-a-key server, cellular connectivity to the communications network being unavailable to the vehicle via the telematics controller of the vehicle, and the local connection to the vehicle of the mobile device having cloud connectivity to the communications network being available, request the consumer access key using the mobile device over the local connection, and receive the consumer access key from the mobile device over the local connection.

3. The system of claim 1, wherein the local connection is a BLUETOOTH Low Energy (BLE) connection.

4. The system of claim 1, wherein the consumer access key is requested is responsive to a condition including one or more of as expiration of the consumer access key, pairing of a new mobile device to the vehicle, or a request from the phone-as-a-key server to refresh one or more or all consumer access keys of the vehicle.

5. The system of claim 1, wherein the connection of the mobile device to the vehicle is using BLUETOOTH Low Energy (BLE), the personal identification code is a numeric code, and the network controller identifier is a media access control (MAC) address.

6. The system of claim 1, wherein the one or more controllers are further configured to:
request to revoke the consumer access key from the phone-as-a-key server using the cellular connection of the one or more controllers when the cellular connection is available; and
request to revoke the consumer access key over the local connection when the cellular connection is unavailable and the local connection is available.

7. A method for connectivity management for phone-based keys by a vehicle, comprising:
requesting a consumer access key from a phone-as-a-key server using a cellular connection of one or more controllers of a vehicle when the cellular connection is available;
requesting the consumer access key over a local connection of the one or more controllers to a mobile device when the cellular connection is unavailable and the local connection is available;
receiving the consumer access key to the one or more controllers via the cellular or local connection over which the consumer access key was requested;
responsive to connection of the mobile device to the vehicle, confirming that the mobile device has a network controller identifier previously paired to the vehicle, the pairing including entry of a personal identification code;
responsive to the confirming, performing a consumer access key challenge with the mobile device, the challenge including verifying the consumer access key of the mobile device with a consumer access key of the vehicle;
response to failure of the consumer access key challenge with the mobile device, requesting, from the vehicle to the phone-as-a-key server, re-delivery to the mobile device of the consumer access key of the mobile device, the re-delivery avoiding re-entry of the personal identification code;
responsive to the re-delivery of the consumer access key of the mobile device, performing a second consumer access key challenge with the mobile device; and
allowing or denying access to the vehicle based on the second consumer access key challenge.

8. The method of claim 7, further comprising:
responsive to a request for the consumer access key to be retrieved from the phone-as-a-key server and cellular connectivity to a communications network being available to the vehicle via a telematics controller of the vehicle, requesting the consumer access key via cellular connectivity using the telematics controller and receiving the consumer access key via cellular connectivity using the telematics controller; and
responsive to the request for the consumer access key to be retrieved from the phone-as-a-key server, cellular connectivity to the communications network being unavailable to the vehicle via the telematics controller of the vehicle, and the local connection to the vehicle of the mobile device having cloud connectivity to the communications network being available, requesting the consumer access key using the mobile device over the local connection, and receiving the consumer access key from the mobile device over the local connection.

9. The method of claim 7, wherein the local connection is a BLUETOOTH Low Energy (BLE) connection.

10. The method of claim 7, wherein the request for the consumer access key is responsive to a condition including one or more of as expiration of the consumer access key, pairing of a new mobile device to the vehicle, or a request from the phone-as-a-key server to refresh one or more or all consumer access keys of the vehicle.

11. The method of claim 7, wherein the connection of the mobile device to the vehicle is using BLUETOOTH Low Energy (BLE), the personal identification code is a numeric code, and the network controller identifier is a media access control (MAC) address.

12. The method of claim 7, further comprising:
  requesting to revoke the consumer access key from the phone-as-a-key server using the cellular connection of the one or more controllers when the cellular connection is available; and
  requesting to revoke the consumer access key over the local connection when the cellular connection is unavailable and the local connection is available.

13. A non-transitory computer-readable medium comprising instructions for connectivity management for phone-based keys, that, when executed by a processor of a vehicle, cause the vehicle to perform operations including to:
  request a consumer access key from a phone-as-a-key server using a cellular connection of one or more controllers of the vehicle when the cellular connection is available;
  request the consumer access key over a local connection of the one or more controllers to a mobile device when the cellular connection is unavailable and the local connection is available;
  receive the consumer access key to the one or more controllers via the cellular or local connection over which the consumer access key was requested;
  responsive to connection of the mobile device to the vehicle, confirm that the mobile device has a network controller identifier previously paired to the vehicle, the pairing including entry of a personal identification code;
  responsive to the confirm, perform a consumer access key challenge with the mobile device, the challenge including verifying the consumer access key of the mobile device with a consumer access key of the vehicle;
  response to failure of the consumer access key challenge with the mobile device, request, from the vehicle to the phone-as-a-key server, re-delivery to the mobile device of the consumer access key of the mobile device, the re-delivery avoiding re-entry of the personal identification code;
  responsive to the re-delivery of the consumer access key of the mobile device, perform a second consumer access key challenge with the mobile device; and
  allow or deny access to the vehicle based on the second consumer access key challenge.

14. The medium of claim 13, wherein the local connection is a BLUETOOTH Low Energy (BLE) connection.

15. The medium of claim 13, wherein the request for the consumer access key is responsive to a condition including one or more of as expiration of the consumer access key, pairing of a new mobile device to the vehicle, or a request from the phone-as-a-key server to refresh one or more or all consumer access keys of the vehicle.

16. The medium of claim 13, wherein the connection of the mobile device to the vehicle is using BLUETOOTH Low Energy (BLE), the personal identification code is a numeric code, and the network controller identifier is a media access control (MAC) address.

17. The medium of claim 13, further comprising instructions that, when executed by the processor of the vehicle, cause the vehicle to perform operations including to:
  request to revoke the consumer access key from the phone-as-a-key server using the cellular connection of the one or more controllers when the cellular connection is available; and
  request to revoke the consumer access key over the local connection when the cellular connection is unavailable and the local connection is available.

\* \* \* \* \*